(12) United States Patent
Eden

(10) Patent No.: US 9,879,652 B2
(45) Date of Patent: Jan. 30, 2018

(54) ADJUSTMENT DEVICE FOR ADJUSTING AN ANGLE OF INCIDENCE OF A ROTOR BLADE OF A WIND POWER PLANT

(75) Inventor: Georg Eden, Westerholt (DE)

(73) Assignee: Wobben Properties GmbH, Aurich (DE)

( * ) Notice: Subject to any disclaimer, the term of this patent is extended or adjusted under 35 U.S.C. 154(b) by 1007 days.

(21) Appl. No.: 13/989,041

(22) PCT Filed: Nov. 23, 2011

(86) PCT No.: PCT/EP2011/070800
§ 371 (c)(1),
(2), (4) Date: Aug. 6, 2013

(87) PCT Pub. No.: WO2012/069532
PCT Pub. Date: May 31, 2012

(65) Prior Publication Data
US 2013/0323055 A1    Dec. 5, 2013

(30) Foreign Application Priority Data

Nov. 23, 2010   (DE) .................. 10 2010 052 272

(51) Int. Cl.
*F03D 7/02*  (2006.01)
(52) U.S. Cl.
CPC ......... *F03D 7/0224* (2013.01); *F03D 7/0264* (2013.01); *F05B 2260/42* (2013.01); *F05B 2270/107* (2013.01); *Y02E 10/721* (2013.01); *Y02E 10/723* (2013.01)

(58) Field of Classification Search
CPC .............................. Y02E 10/723; Y02E 60/15
See application file for complete search history.

(56) References Cited

U.S. PATENT DOCUMENTS

| | | | |
|---|---|---|---|
| 7,566,981 B2 | 7/2009 | Kunkel et al. | |
| 7,566,982 B2 | 7/2009 | Voss | |
| 2006/0267410 A1* | 11/2006 | Kanouda | H02J 9/061 307/66 |

(Continued)

FOREIGN PATENT DOCUMENTS

| | | |
|---|---|---|
| DE | 103 35 575 A1 | 3/2005 |
| DE | 10 2005 030 709 A1 | 1/2007 |

(Continued)

*Primary Examiner* — Eduardo Colon Santana
*Assistant Examiner* — Charles S Laughlin
(74) *Attorney, Agent, or Firm* — Seed IP Law Group LLP

(57) ABSTRACT

The invention concerns an adjusting device for adjusting the pitch angle of a rotor blade of a wind power installation including an adjusting motor for moving the rotor blade through the pitch angle, an actuating unit for actuating the adjusting motor with electric current, wherein the actuating unit is connected to an electric power supply network, and an emergency power supply device for supplying and actuating the adjusting motor with electric current in the event of a failure of the electric power supply network, wherein the emergency power supply device has an electric storage means for storing electric energy to provide the electric current for actuation of the adjusting motor and wherein the actuating unit is adapted to charge up the electric storage means of the emergency power supply device with electric energy.

13 Claims, 2 Drawing Sheets

(56) References Cited

U.S. PATENT DOCUMENTS

| | | | | |
|---|---|---|---|---|
| 2007/0024227 A1* | 2/2007 | Kunkel | ............. | F03D 7/0224 |
| | | | | 318/479 |
| 2007/0057516 A1* | 3/2007 | Mever | ............. | F03D 7/0224 |
| | | | | 290/44 |
| 2007/0267873 A1* | 11/2007 | Teichmann | ........... | F03D 7/0224 |
| | | | | 290/44 |
| 2008/0129234 A1* | 6/2008 | Buente | ............. | F03D 7/0224 |
| | | | | 318/280 |

FOREIGN PATENT DOCUMENTS

| | | |
|---|---|---|
| DE | 20 2006 018 866 U1 | 4/2007 |
| DE | 20 2006 018 886 U1 | 4/2007 |
| EP | 1 852 605 A2 | 11/2007 |
| EP | 1 916 417 A2 | 4/2008 |
| RU | 2 350 778 C2 | 3/2009 |

\* cited by examiner

ADJUSTMENT DEVICE FOR ADJUSTING AN ANGLE OF INCIDENCE OF A ROTOR BLADE OF A WIND POWER PLANT

BACKGROUND

Technical Field

The present invention concerns an adjusting device for adjusting the rotor blade pitch angle of a wind power installation and a method of operating such a device.

Description of the Related Art

Wind power installations are generally known. The type of installation which is mostly widely used at the present time is a so-called horizontal-axis wind power installation in which an aerodynamic rotor driven by the wind rotates substantially about a horizontal axis. In that case in normal operation the axis faces substantially in the direction of the wind and the rotor has at least one and usually three rotor blades which pass over a rotor area which is thus arranged substantially transversely relative to the wind. FIG. 3 shows such a wind power installation.

A pitch angle of each rotor blade relative to the wind can be altered in dependence on the wind speed. In other words, the rotor blade is turned substantially about its longitudinal axis in order to change that pitch angle and thus the afflux flow angle. The pitch angle is frequently also referred to as the angle of attack and adjustment of the pitch angle is frequently referred to as pitching.

To carry out the pitching operation, an adjusting device is used which usually employs an electric drive. The electric drive is operated by means of a power unit which is supplied with electric energy by an electric power supply network.

The power unit for supplying the adjusting drive with power is adapted to the adjusting drive which can also be referred to as the pitch drive. When using a dc motor as the pitch drive the power unit operates as a so-called dc controller. In other words the power unit provides a direct current of the respective current strength which is required for performing the respective adjusting movement.

In the event of failure of the electric supply network there is provided an electric storage means which has stored sufficient energy for the electric drive to adjust the rotor blade into a so-called feathered position. It is to be understood that the electric storage means has that corresponding amount of energy, and thus after a use it is to be charged up again and otherwise care is to be taken to ensure that any self-discharge is compensated by a so-called compensating trickle charge.

Charging of the electric storage means is effected by way of a separate current source which is adapted in its output voltage to the voltage of the electric storage means. In addition there is provided a compensating trickle charge device which performs the described compensating charging operation. It is also adapted in its output voltage to the voltage of the electric storage means and autonomously performs re-charging of the electric storage means in dependence on its charge state.

Such systems are correspondingly complex because they have to perform the described tasks and must function reliably and redundantly.

As general state of the art attention is directed to DE 20 2006 018 866 U1.

BRIEF SUMMARY

According to one embodiment of the invention therefore there is proposed an adjusting device that has an adjusting motor for moving a rotor blade through a pitch angle, that is to say for pitch control, an actuating unit for actuating the adjusting motor with electric current, and an emergency or backup power supply device for supplying and actuating the adjusting motor with electric current in the event of a failure of the power supply network or when additional power may be needed such as during a planned power supply shutdown. The emergency power supply device has an electric storage means, such as a capacitor or battery or other electrical storage device, for storing electric energy to provide electric current for actuation of the adjusting motor. In addition the actuating unit is adapted to charge up the electric storage means of the emergency power supply device with electric energy. The actuating unit is thus adapted to perform a dual function, namely on the one hand supplying the adjusting motor with the necessary electric current and on the other hand charging up the electric storage means of the emergency power supply device.

It is to be noted that rotor blades of modern wind power installations can weigh several tons. The largest rotor blade known at the present time of a wind power installation is of a width of over 5 meters in the region of the rotor blade root, that is to say at the portion of the rotor blade that is towards the rotor axis, and it is of a length of almost 60 meters. Nonetheless a rapid adjusting movement of the rotor blade is required in particular to prevent overloadings in the event of severe gusts of wind. In other words a large powerful and at the same time dynamic adjusting drive is required. There are corresponding demands on the actuating unit. In that respect the actuating unit is adapted to the electric behavior of the adjusting motor. In particular such an adjusting motor has an inductive behavior and the relationships between current and voltage are also influenced by the movement of the motor, and in particular a rotary speed-dependent countervoltage occurs.

In contrast an electric storage means like a capacitor or a battery has an entirely different behavior. The voltage at such an electric storage means depends in particular on the charge state and the respectively prevailing internal resistance. An ideal capacitor has no internal resistance at all and the voltage then depends exclusively on the charge state. Real capacitors can get quite close to the ideal behavior and in that respect are fundamentally different from the electric behavior of an inductor, in particular a motor.

According to the invention it was realized that it is possible for the actuating unit to be adapted to the respective task, namely actuation of the adjusting motor on the one hand and charging of the electric storage means on the other hand, and to provide corresponding switching elements. That makes it possible to save on a separate charging unit.

Preferably there is provided a switching device, in particular one or two switches for connecting the actuating unit to the electric storage means of the emergency storage device to charge the electric storage means. In that way the actuating unit can be easily connected to the adjusting motor for normal operation in order to actuate the adjusting motor. In that respect the term normal operation is used to mean operation in which an electric power supply network is available for supplying power to the actuating unit for adjusting the adjusting motor. For charging the electric storage means of the emergency storage device, that switching device only needs to be suitably switched over to use the actuating unit for charging purposes. That switching device thus connects the actuating unit either to the motor for adjusting it or to the electric storage means for charging it.

Preferably there is provided a compensating charging unit for regularly re-charging the electric storage means with electric energy in order to re-charge electric energy by which the electric storage means was discharged by leakage currents and/or by self-discharge. Such a compensating charging unit only needs to provide a comparatively low charging current in comparison with the actuating unit as it is only used for re-charging a small part of the total charging capacity of the electric storage means. It can thus be of comparatively small size and is markedly less expensive in comparison with the actuating unit.

It is also advantageous if the electric storage means substantially comprises capacitors, lead gel accumulators or lithium ion accumulators. Those components are found to be desirable components for use in an adjusting device because they can provide a comparatively high storage capacity and in addition are suitable for continuous operation. They are also suitable for being arranged in a rotor of a wind power installation and thus being constantly rotated.

It is preferably proposed that an inductive component and/or a rectifier means be arranged between the electric storage means and the actuating unit. The rectifier means avoids unwanted discharge of the electric storage means in relation to the actuating unit. The electric performance of the electric storage unit can be altered from the point of view of the actuating unit by the inductive component, thus the overall charging characteristic of the charging circuit is altered when charging the electric storage unit by way of such an inductive component.

There is further proposed a method of operating an adjusting device for adjusting the pitch angle of a rotor blade of a wind power. In accordance therewith the rotor blade is moved by means of an adjusting motor, namely substantially about its longitudinal axis, to adjust the pitch angle. In that case the adjusting motor is supplied with electric current by means of an actuating unit. The adjusting motor is thus an electric adjusting motor. In particular the actuating unit controls the necessary electric current for performing the desired movement of the adjusting motor. In that respect the actuating unit can take account of current positions of the adjusting motor and/or the rotor blade to perform control in the sense of closed-loop control, that is to say with actual value feedback.

In addition the method includes charging an electric storage means of an emergency power supply device with electric energy, wherein charging is effected by means of the same actuating unit which supplies the adjusting motor with electric current and which in particular controls the current. The actuating unit is connected to an electric power supply network and is supplied therefrom with electric energy.

The method further includes supplying and actuating the adjusting motor with electric current by means of the emergency power supply device if the electric supply network fails. The emergency power supply device takes the energy for providing the electric current from the electric storage means of the emergency power supply device. The method therefore proposes both supplying the adjusting motor with electric current and also charging the electric storage means of the emergency power supply device with electric energy, by means of an actuating unit.

Preferably charging of the electric storage means is effected in at least one of the following cases. In one case, it is effected upon or at the end of the procedure of bringing the wind power installation into operation, that is to say initial start-up. In a further case charging is effected after there has been a failure of the power supply network, that is to say after one or more rotor blades has been turned into the wind by means of the emergency power supply device after a network failure. In addition charging of the energy storage means can be effected after it has been deliberately discharged, which can occur for example for test purposes or for maintenance purposes on the energy storage means or other parts of the arrangement. A further situation occurs if no compensating charge procedure was performed because of a network failure or disconnection from the network, for a prolonged time.

Preferably the proposed method is carried out by means of one of the above-described adjusting devices.

It is also proposed that a wind power installation be fitted with such an adjusting device, that is to say an adjusting device according to the invention. That is intended to reduce costs of the wind power installation and/or increase its efficiency to the maximum possible extent.

BRIEF DESCRIPTION OF THE SEVERAL VIEWS OF THE DRAWINGS

The invention is described in greater detail by way of example hereinafter with reference to the accompanying Figures.

DETAILED DESCRIPTION

Figure 1:
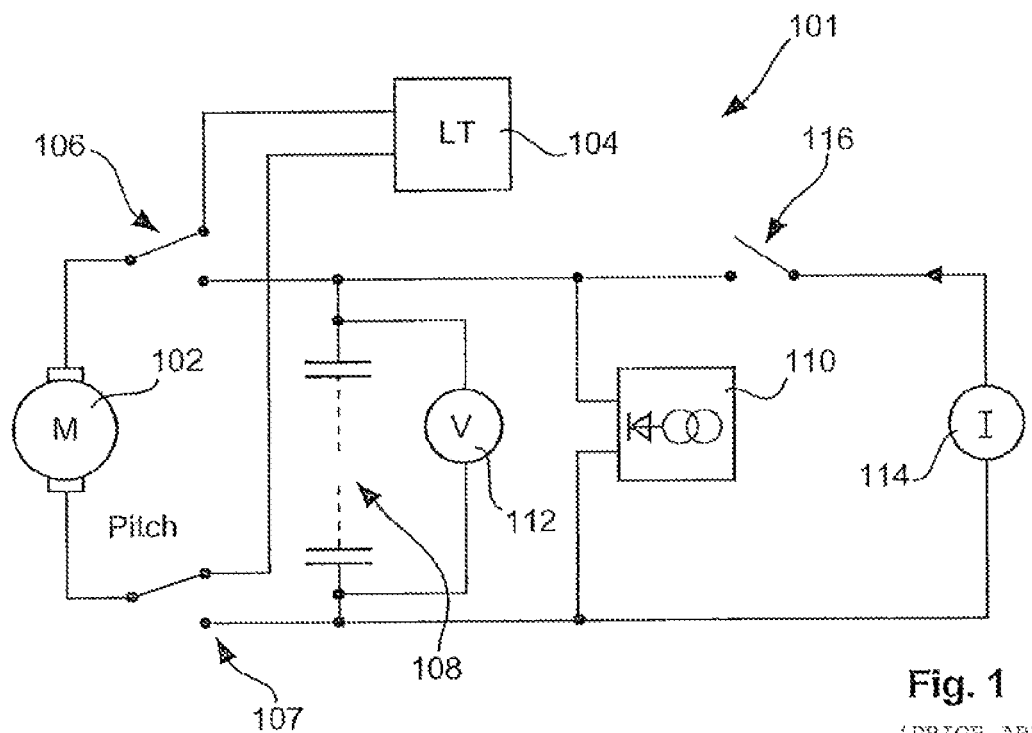
FIG. 1 diagrammatically shows a circuit for an adjusting device for adjusting the pitch angle of a rotor blade in accordance with the state of the art, FIG. 2 diagrammatically shows a circuit of an adjusting device for adjusting the pitch angle of a rotor blade in accordance with an embodiment of the present invention.

The circuit of the adjusting device or adjusting apparatus 101 has an adjusting motor 102 for adjusting the pitch angle. The adjusting motor 102 is actuated by means of the dc controller 104 which can generally also be referred to as the power unit to implement a respective adjusting procedure. The dc controller 104 is supplied with energy by an electric power supply network, which is not shown in FIG. 1 for the sake of clarity of the drawing. An electrically operative connection is made between the dc controller 104 and the adjusting motor 102 by means of the change-over switches 106 and 107 in normal operation of the wind power installation and actuation of the adjusting motor 102 can thus be effected as described by the dc controller 104.

In the event of a network failure of the power supply network the adjusting motor 102 is to be operated by means of an electric intermediate storage means 108. For that purpose the change-over switches 106 and 107 are switched into a position in which a connection is made between the electric intermediate storage means 108 and the adjusting motor 102.

A suitable compensating charging circuit 110 is provided for performing so-called compensating trickle charging. That provides that a slight discharge of the electric intermediate storage means 108, which is caused for example by leakage currents and/or self-discharge, is prevented or compensated. The compensating charging circuit 110 therefore only needs to be sized for a low level of power. The compensating charging circuit 110 is also supplied with energy by an electric power supply network. The voltage of the electric intermediate storage means 108 is measured and monitored by means of a voltage measuring device 112. The measured voltage can also give information about the charge state of the electric intermediate storage means 108.

To charge the electric intermediate storage means 208 to an extent which goes beyond that which the compensating charging circuit 110 can provide, the assembly has a charging device, in particular a current source 114, which is also fed by an electric power supply network, which is not shown in FIG. 1 for the sake of enhanced clarity. A charging switch 116 and a charging device 114 are provided for performing charging of the electric intermediate storage means 108. When the charging switch 116 is closed the electric intermediate storage means 108 can be charged.

Now according to the invention inter alia there is provided an adjusting device which is simplified in comparison with the state of the art. For that purpose it is proposed that a saving is made in respect of the current source 114.

Figure 2:
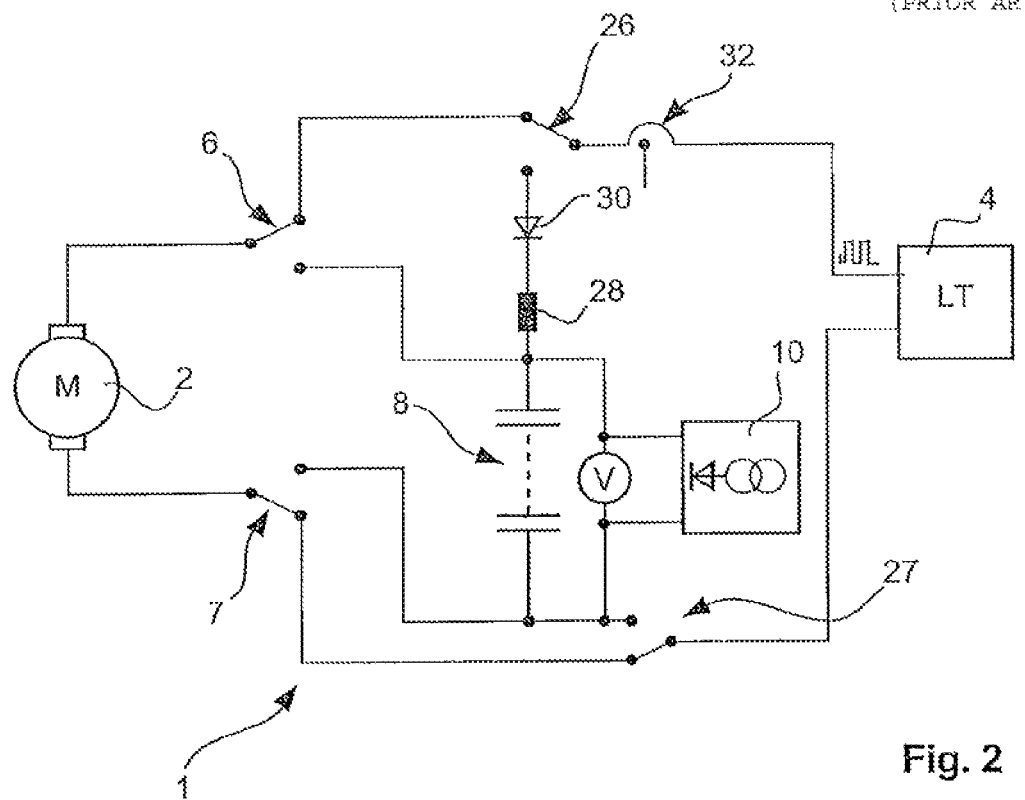
Figure 3:
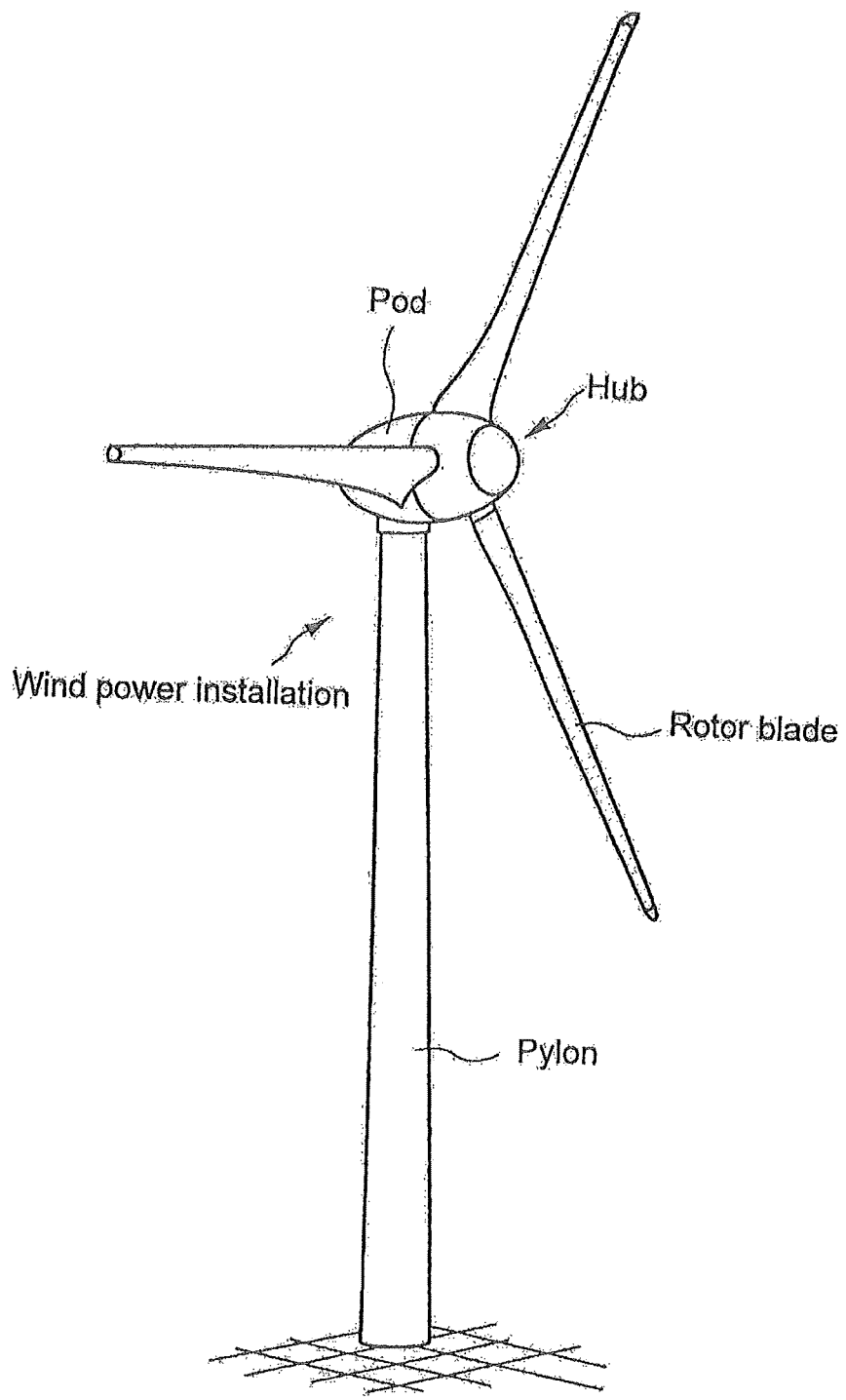
FIG. 3 shows a wind power installation according to the invention.

A corresponding embodiment is described with reference to FIG. 2. The illustrated circuit of an adjusting device 1 includes an adjusting motor 2 actuated by way of an actuating unit 4 which operates as a dc controller. The actuating unit 4 operating as the dc controller produces the current to be controlled by means of pulse width modulation in accordance with the illustrated embodiment. To actuate the adjusting motor 2 corresponding change-over switches 6 and 7, and 26 and 27 are to be so switched that the dc controller is electrically operatively connected to the adjusting motor 2.

In the case of a network failure of the power supply network actuation of the adjusting motor 2 can be effected by means of energy from the electric intermediate storage means 8. The change-over switches 6 and 7 are suitably switched over for that situation. The compensating charging circuit 10 is provided for performing compensating trickle charging. Such a compensating charging circuit 10 is usually not sized to perform a charging operation which goes beyond compensating trickle charging.

To entirely or partially charge up the electric intermediate storage means 8 beyond a compensating trickle charge it is therefore proposed that the actuating unit 4, namely the dc controller 4, be used for charging up the electrical intermediate storage means 8. An electrically operative connection can be made between the actuating unit 4 and the electric intermediate storage means 8 by means of the change-over switches 26 and 27. With a suitable switch position for the change-over switches 26 and 27 that gives a charging circuit in which an inductive component, in particular a choke 28 as well as a rectifier means, in particular a diode 30, are also arranged in series. There is also a current sensor 32 which can measure the charging current which is controlled for charging the electric storage means 8. In normal operation, when the actuating unit 4 actuates the adjusting motor 2, the current sensor 32 can also be used for measuring any actuating current.

Preferably the actuating unit 4 uses a pulse width-modulated method for producing a charging current for the electric intermediate storage means 8. In that case, firstly—in basically known fashion—a pulse signal is generated with a plurality of square-wave pulses. The inductive component 28 is suitable for smoothing that signal and in particular also avoiding damage to the electric intermediate storage means. The adjusting motor 2 on the one hand and the electric intermediate storage means 8 on the other hand have basically different electric properties, namely the adjusting motor 2 has substantially inductive properties and the electric intermediate storage means 8 has substantially capacitive properties. By virtue of the series connection of the inductive component 28, the properties thereof can be matched at least a little, which at least simplifies the proposed option of dual utilization of an actuating unit, even if not first making that possible. Equally the actuating unit 4 is preferably to be adapted to the different requirements, namely actuation of an adjusting motor 4 on the one hand and charging of an electric intermediate storage means 8 on the other hand.

The rectifier means 30 which is shown in the form of a diode and which can be in the form of such a diode prevents unwanted discharge of the electric intermediate storage means for example by way of the actuating unit 4.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An adjusting device for adjusting the pitch angle of a rotor blade of a wind power installation, the adjusting device comprising:
   an adjusting motor for moving the rotor blade through the pitch angle;
   an actuating unit operable as a direct current (DC) controller and for actuating the adjusting motor with electric current, wherein the actuating unit is connected to an electric power supply network;
   a backup power supply device for supplying and actuating the adjusting motor with electric current in the event of a failure of the electric power supply network; and
   a switching device coupled to the adjusting motor, actuating unit and backup power supply device, the switching device for switching between a first electrically conductive state and a second electrically conductive state,
   wherein the backup power supply device includes an electric storage means for storing electric energy to provide the electric current for actuation of the adjusting motor, and wherein the actuating unit is adapted to charge up the electric storage means of the backup power supply device with electric energy,
   wherein when the switching device is in the first electrically conductive state, the switching device electrically connects the actuating unit to the adjusting motor for actuating the adjusting motor and when the switching device is in the second electrically conductive state, the switching device electrically connects the actuating unit to the electric storage means of the backup power supply device for charging the electric storage means of the backup power supply device and
   wherein an inductive component and a rectifier are connected in series between the electric storage means and the actuating unit so that upon charging of the electric storage means, by means of the actuating unit, a charging current flows from the actuating unit by way of said inductive component and said rectifier.

2. The adjusting device according to claim 1 comprising a compensating charging unit for selectively re-charging the electric storage means with electric energy in the event the electric storage means discharges by at least one of leakage currents and self-discharge.

3. The adjusting device according to claim 1 wherein the electric storage means includes at least one of capacitors, lead gel accumulators, and lithium ion accumulators.

4. A method of operating an adjusting device for adjusting the pitch angle of a rotor blade of a wind power installation, the method comprising:
using an actuating unit, operable as a direct current (DC) controller connected to an electric power supply network, to supply an adjusting motor with electrical current to move the rotor blade to adjust the pitch angle;
using the actuating unit to charge an electric storage means of a backup power supply device with electric energy;
using the backup power supply device from the electric storage means to supply and actuate the adjusting motor with electric current in the event of failure of the electric power supply network; and
using a switching device coupled to the adjusting motor, actuating unit and backup power supply device to switch between a first electrically conductive state and a second electrically conductive state,
wherein when the switching device is in the first electrically conductive state, the switching device electrically connects the actuating unit to the adjusting motor for actuating the adjusting motor and when the switching device is in the second electrically conductive state, the switching device electrically connects the actuating unit to the electric storage means of the backup power supply device for charging the electric storage means of the backup power supply device, and
wherein an inductive component and a rectifier are connected in series between the electric storage means and the actuating unit so that upon charging of the electric storage means, by means of the actuating unit, a charging current flows from the actuating unit by way of said inductive component and said rectifier.

5. The method according to claim 4 wherein charging of the electric current is effected when the wind power installation is operating, after actuation of the adjusting motor by the backup power supply device in the event of failure of the power supply network and after deliberate discharging of the electric storage means.

6. The method according to claim 4 further comprising prior to using the actuating unit to charge an electric storage means, connecting the actuating unit to the electric storage means of the backup power supply device.

7. A wind power installation comprising:
at least one rotor blade:
an adjusting device configured to adjust a pitch angle of the rotor blade, the adjusting device including:
an adjusting motor operable as a direct current (DC) controller and for moving the rotor blade through the pitch angle;
an actuating unit for actuating the adjusting motor with electric current;
an electric power supply network electrically coupled to the actuating unit and configured to power the actuating unit;
a backup power supply device for supplying and actuating the adjusting motor with electric current in the event of a failure of the electric power supply network, the backup power supply device including an electric storage device for storing electrical energy to provide the electric current for actuation of the adjusting motor, and wherein the actuating unit is adapted to charge the electric storage device with electrical energy; and
a switching device coupled to the adjusting motor, actuating unit and backup power supply device, the switching device being configured to switch between a first electrically conductive state and a second electrically conductive state,
wherein when the switching device is in the first electrically conductive state, the switching device electrically connects the actuating unit to the adjusting motor for actuating the adjusting motor and when the switching device is in the second electrically conductive state, the switching device electrically connects the actuating unit to the electric storage device of the backup power supply device for charging the electric storage device of the backup power supply device, and
wherein an inductive component and a rectifier are connected in series between the electric storage means and the actuating unit so that upon charging of the electric storage means, by means of the actuating unit, a charging current flows from the actuating unit by way of said inductive component and said rectifier.

8. The wind power installation according to claim 7 wherein the electric storage device is a capacitor or a battery.

9. The wind power installation according to claim 7 further comprising a compensating charging unit for selectively re-charging the electric storage device with electrical energy in the event the electric storage device discharges electrical energy.

10. An adjusting device for adjusting the pitch angle of a rotor blade of a wind power installation, the adjusting device comprising:
a motor coupled to the rotor blade;
a direct current (dc) controller;
a backup power supply device that includes an electric storage device;
a first set of switches configured to couple the dc controller to the motor;
a switching device, coupled to the motor, dc controller and backup power supply device, configured to switch between a first electrically conductive state and a second electrically conductive state,
an inductive component and
a rectifier;
wherein when the switching device is in the first electrically conductive state, the switching device electrically connects the dc controller to the motor for actuating the motor and when the switching device is in the second electrically conductive state, the switching device electrically connects the dc controller to the backup power supply device for charging the backup power supply device, and
wherein the inductive component and the rectifier are connected in series between the electric storage means and the dc controller so that upon charging of the electric storage device, by means of the dc controller, a charging current flows from the dc controller by way of said inductive component and said rectifier.

11. The adjusting device according to claim 10 further comprising a diode located between the switching device and the backup power supply device.

12. The adjusting device according to claim 10 further comprising a choke located between the switching device and the backup power supply device.

13. The adjusting device according to claim 10 further comprising a diode and a choke, that are serially coupled to one another, and are together coupled between the switching device and the backup power supply device.

\* \* \* \* \*